(12) United States Patent
Silic et al.

(10) Patent No.: US 9,168,491 B2
(45) Date of Patent: Oct. 27, 2015

(54) EMISSION CONTROL SYSTEM

(75) Inventors: Florijan Silic, Jindalee (AU); Gabriel Silic, Clifton Hill (AU); Ivan Silic, Cheltenham East (AU); Mark Silic, Greensborough (AU)

(73) Assignee: Emission Logistics PTY LTD, Indooroopilly (AU)

( * ) Notice: Subject to any disclaimer, the term of this patent is extended or adjusted under 35 U.S.C. 154(b) by 0 days.

(21) Appl. No.: 14/342,710

(22) PCT Filed: Sep. 5, 2012

(86) PCT No.: PCT/AU2012/001047
§ 371 (c)(1),
(2), (4) Date: May 27, 2014

(87) PCT Pub. No.: WO2013/033763
PCT Pub. Date: Mar. 14, 2013

(65) Prior Publication Data
US 2014/0328739 A1    Nov. 6, 2014

(30) Foreign Application Priority Data

Sep. 5, 2011 (AU) ................................. 2011903587

(51) Int. Cl.
| | | |
|---|---|---|
| *B01D 53/00* | (2006.01) | |
| *B01D 53/14* | (2006.01) | |
| *B01D 53/34* | (2006.01) | |
| *B01D 53/50* | (2006.01) | |

(Continued)

(52) U.S. Cl.
CPC ............... *B01D 53/75* (2013.01); *B01D 47/021* (2013.01); *B01D 53/73* (2013.01); *B01D 53/92* (2013.01); *F23J 15/006* (2013.01); *F23J 15/04* (2013.01); *B01D 2257/302* (2013.01);

(Continued)

(58) Field of Classification Search
CPC ........ B01D 53/00; B01D 53/14; B01D 53/75; B01D 53/34; B01D 53/50; B01D 53/56; B01D 53/64; B01D 53/72
USPC .................................................... 422/169, 170
See application file for complete search history.

(56) References Cited

U.S. PATENT DOCUMENTS 3,737,515 A * 6/1973 Veloso .......................... 423/213.7
5,053,210 A   10/1991 Buxel et al.

(Continued)

FOREIGN PATENT DOCUMENTS

| AT | 405792 B | 11/1999 | | |
|---|---|---|---|---|
| DE | 101 13 792 A1 * | 9/2002 | ............. | B01D 53/04 |
| WO | WO 2012/128721 A2 * | 9/2012 | ............. | B01D 53/50 |

OTHER PUBLICATIONS

International Search Report for PCT/AU2012/001047, Oct. 2012.

*Primary Examiner* — Timothy Vanoy
(74) *Attorney, Agent, or Firm* — Locke Lord LLP; Jeffrey D. Hsi (57) ABSTRACT

A method and apparatus for treating an exhaust or waste gas stream to remove pollutants from the gas stream using gas stabilization to allow the cleaned gas stream to be discharged directly to atmosphere. The apparatus includes at least three treatment stations for treating the gas stream in sequence, in which one of the treatment stations is a wet reactor containing a nucleating or precipitating liquids for removing the unwanted material as a solid and for oxygenating the gas stream to remove any residual unwanted material, and another of the treatment stations is a gas compressing stage for compressing the gas stream. The advantage of the method and apparatus is that the treated gas steam can be discharged directly to atmosphere with reduced amounts of pollutants.

20 Claims, 2 Drawing Sheets

(51) Int. Cl.
  *B01D 53/56* (2006.01)
  *B01D 53/64* (2006.01)
  *B01D 53/72* (2006.01)
  *B01D 53/75* (2006.01)
  *B01D 53/92* (2006.01)
  *B01D 47/02* (2006.01)
  *F23J 15/00* (2006.01)
  *F23J 15/04* (2006.01)
  *B01D 53/73* (2006.01)

(52) U.S. Cl.
  CPC .... *B01D 2257/404* (2013.01); *B01D 2257/502* (2013.01); *B01D 2257/504* (2013.01); *B01D 2257/702* (2013.01); *B01D 2258/012* (2013.01); *B01D 2258/0283* (2013.01); *B01D 2259/124* (2013.01); *F23J 2215/50* (2013.01); *F23J 2215/60* (2013.01)

(56) References Cited

U.S. PATENT DOCUMENTS

| | | | |
|---|---|---|---|
| 5,330,725 A | * | 7/1994 | Mumalo .................. 422/170 |
| 7,842,264 B2 | | 11/2010 | Cooper et al. |
| 2004/0001788 A1 | | 1/2004 | Marin et al. |

* cited by examiner

EMISSION CONTROL SYSTEM

CROSS-REFERENCE TO RELATED APPLICATIONS

This application is the national phase under 35 U.S.C. §371 of PCT International Application No. PCT/AU2012/001047, filed Sep. 5, 2012, which claims the benefit of Australian Patent Application No. 2011903587, filed Sep. 5, 2011, the entire contents of the aforementioned applications are hereby incorporated herein by reference.

FIELD OF THE INVENTION

The present invention relates to a method and apparatus for treating gases to render the gases less polluting.

In one form, the present invention relates to a method or apparatus for treating an exhaust gas stream to remove one or more unwanted materials from the exhaust gas stream so as to clean the exhaust gas to make it less polluting when the gases are discharged to atmosphere.

In one form, the present invention relates to a process or method having two or more process or treatment steps for sequentially treating an exhaust gas stream to remove some of the unwanted materials from the exhaust gas stream in sequence thereby making the treated gas stream less polluting allowing the treated exhaust gas to be returned to atmosphere.

The present invention finds particular application for treating exhaust gas emissions emanating from operation of industrial processes and/or machinery for cleaning the exhaust gas emissions at least partially so that the treated emission stream is less polluting by containing reduced amounts of unwanted materials hence allowing the treated gas stream to be returned to atmosphere with a reduced chance that the stream is polluting.

Although the present invention will be described with particular reference to one embodiment of the method and apparatus for treating exhaust emissions, it is to be noted that the invention is not restricted in scope to the described embodiment, but rather the present invention is more extensive so as to include other forms and arrangements of the apparatus, other forms and arrangements of the process and the use of the various forms and arrangements of the methods and apparatus in applications other than specifically described.

BACKGROUND OF THE INVENTION

Many people believe that the amount of carbon dioxide in the atmosphere contributes to anthropogenic global warming. Scientific modelling of the carbon dioxide content in the atmosphere tends to confirm the view that increased amounts of carbon dioxide are to be avoided if the earth is able to better manage climate change. Carbon dioxide gas is one component of exhaust gases, particularly exhaust gases from processes involving the combustion of fossil fuels which have a high carbon content that, when combined with oxygen during combustion processes, produce carbon dioxide together with other materials, which are then discharged directly to atmosphere. Thus, there is a need to reduce the amount of carbon dioxide discharged into the atmosphere through combustion of fossil fuels.

One of the leading causes of the increased amount of carbon dioxide is through the exhaust gases of motor vehicles being discharged to atmosphere without adequate treatment. Although there have been attempts to reduce the amount of carbon dioxide being emitted by motor vehicles, not all attempts have been successful.

Additionally, many other polluting materials which are either noxious or toxic are emitted in the combustion process through the exhaust gases and discharged to the atmosphere. The other polluting materials include other oxides of carbon, oxides of nitrogen and sulphur, hydrocarbon materials, and very small sized particulate matter to name but some of the offending materials. The other polluting materials contribute to unacceptable climate change and may even hasten the rate of climate change. Thus, there is a need to remove carbon dioxide and other pollutants, such as toxic substances, from exhaust gas streams which are produced from motor vehicles and industrial processes and which are being discharged directly to atmosphere.

Furthermore, increasingly stringent legislation requires that reduced amount of carbon dioxide and other pollutants including nitrogen containing oxides, sulphur containing oxides, hydrocarbons, and particulate matter not be emitted with the exhaust gas for discharge directly to atmosphere. In an idealised situation, it is preferable that none of these pollutants be discharged directly to atmosphere.

Accordingly, it is an aim of the present invention to reduce the amount of carbon dioxide being emitted to atmosphere from combustion processes and apparatus.

Accordingly, it is an aim of the present invention to provide a process for treating exhaust gas emissions so as to reduce the polluting effect of the gas stream.

Accordingly, it is an aim of the present invention to provide an apparatus for treating exhaust gases to remove unwanted materials so that the treated exhaust gas is less polluting and more able to be directly discharged to the atmosphere.

Accordingly, it is an aim of the present invention to provide a method and apparatus for cleaning exhaust or waste gases by removing certain polluting materials from the gases being treated.

SUMMARY OF THE INVENTION

According to one aspect of the present invention, there is provided a method of treating an exhaust gas stream to remove unwanted material from the exhaust gas stream in order to clean the exhaust gas so that the cleaned exhaust gas is less polluting than prior to treatment, using a process of stabilising the exhaust gas stream during the treatment, the treatment comprising the steps of directing the exhaust gas stream having at least a first unwanted material and a second unwanted material from a source of the exhaust gas to a first treatment station for initially treating the exhaust gas stream to form a first treated stream, said first treatment station being of a first capacity and containing at least a first liquid precipitating or nucleating agent for interaction with at least the first of the unwanted materials of the exhaust gas stream to remove at least some of the at least first unwanted material from the exhaust gas stream to form the first initial treated stream, said first unwanted material being removed from the exhaust gas stream substantially in the form of a solid material, wherein oxygen removed from the first treated stream due to interaction with the first liquid precipitating or nucleating agent to form the substantially solid material is released into the first treated exhaust gas stream to form an oxygenated exhaust gas stream, discharging the oxygenated exhaust gas stream containing the oxygenated material from the first treatment station and introducing the discharged oxygenating exhaust gas stream into a second treatment station of a second capacity, said second capacity being less than the first capacity, said second treatment station containing at least a second liquid precipitating or nucleating agent for interaction with the oxygenated exhaust gas stream to remove at least some of the second unwanted material from the oxygenated exhaust gas stream substantially in the form of solid material so as to form a second treated gas stream, discharging the second treated gas stream from the second treatment station to a third treatment station for compressing the second treated gas stream to form a substantially cleaned gas stream, wherein the third treatment station is substantially isolated from atmosphere so as to substantially prevent atmospheric air from contacting the second treated gas stream in the third treatment station to interact with the second treated gas stream, wherein the clean gas stream discharged from the third treatment station is substantially free of the first and of the second unwanted materials, and discharging the cleaned gas stream to atmosphere so that the cleaned gas stream is less polluting than the untreated exhaust gas stream.

According to another aspect of the present invention, there is provided an apparatus for carrying out a method of treating an exhaust gas stream to remove unwanted materials in order to clean the exhaust gas to be less polluting for discharge to atmosphere, using stabilisation of the exhaust gas stream when in the apparatus, the apparatus comprising a first treatment station having an inlet through which the exhaust gas stream is introduced into the first treatment station for treatment therein, in which at least a first unwanted material is substantially removed from the exhaust gas stream substantially in the form of a solid to form an oxygenated gas stream, the first treatment station having an outlet for discharging the oxygenated gas stream to a second treatment station in which at least a second unwanted material is substantially removed from the oxygenated gas stream substantially in the form of a solid, to form a second treated gas stream, and a third treatment station for substantially compressing the second treated gas stream in the absence of atmospheric air to form a cleaned gas stream wherein the exhaust gas stream is passed sequentially through the first, second and third gas streams in sequence to remove substantially the first and the second unwanted materials from the exhaust gas stream.

BRIEF DESCRIPTION OF ASPECTS OF EMBODIMENTS

Typically, in one form, the method and apparatus of the present invention involves using one or other forms of a Silic Pollution Reduction System© (SPRS), which system is used primarily to clean the exhaust emissions from combustions processes using fossil fuel that results in the production of carbon dioxide and other pollutants, including greenhouse gases.

In one form, SPRS technology and processing involves stabilisation of the exhaust or waste gases during their treatment.

In particular, the process and method of the present invention involves solidification, collection and separation of gaseous matter from exhaust gas streams to remove unwanted materials such as pollutants, toxic materials, carbon dioxide, greenhouse gases, particulate matter and the like.

The present invention can be used to clean the exhaust gas stream from industrial processes, waste gas streams from commercial plants and installations, exhaust gas streams from motor vehicles, including cars, buses, trucks and the like, and other machinery and plant using engines that burn fossil fuels, such as the various hydrocarbon fuels that are available.

In one form, the apparatus and process relates to cleaning exhaust emissions from a variety of different fuels including, hydrocarbon fuels such as gas, petrol, diesel, aviation fuel, kerosene, or similar, coal based fuels, and other fuels such as ethanol based fuels, fuels derived from bio processes, such as bio-diesel or the like, fuels obtained from vegetation, such as palm oil, or fuels containing additives and the like.

Typically, the unwanted materials include compositions or compounds containing carbon, nitrogen, sulphur, and the like. More typically, the unwanted materials are oxides of carbon, ($CO_x$), oxides of nitrogen ($NO_x$), oxides of sulphur ($SO_x$), hydrocarbon materials ($C_xH_y$) or the like.

Typically, the first treatment station is a vessel, tank, reactor, or similar container, or the like. More typically, the reactor has an inlet, more typically, a single inlet, for receiving untreated exhaust gases such as for example, from a motor vehicle. Even more typically, the vessel has two or more outlets, one outlet for discharging initially treated gases which in one form are oxygenated gas streams or the like, the other outlet for discharging solids removed from the exhaust gas stream during treatment. Even more typically, the reactor is provided with a one way valve or similar for allowing gas to be discharged but retaining liquid within the reactor so as to conserve the amount of liquid retained in the reactor, including the liquid precipitating and/or nucleating agent.

In one form, the method and apparatus of the present invention comprises at least two treatment stations. More typically, there are additional treatment stations such as for example, three, four or more individual treatment stations. Typically, the third and subsequent treatment stations are similar to the second treatment station. More typically, the treatment stations are arranged in sequence so that a treated gas stream from a preceding treatment station is conveyed to the next treatment station in the sequence for subsequent treatment, so that after introduction into the first treatment station, when the initially treated or oxygenated exhaust gas stream passes through each of the treatment stations in turn, the treated gas stream emerges from the last treatment station in a cleaned form which is substantially free of selected unwanted pollutants and is in a condition suitable for discharge directly to atmosphere.

In one form, one of the treatment stations is a gas compressor. In another form, one of the treatment stations is a gas stabiliser. In one form, the overall treatment process maintains stabilisation of the exhaust gas stream being treated.

In one form, stabilisation can be regarded as a mild temperature drop of the gas stream being treated in the reactor which is achieved through flow of emissions being directed from a single inlet into two outlets which connect on both sides of the bottom of the reaction chamber of the reactor.

In some embodiments, compression of the gas either in the gas compressor or in the gas stabiliser, causes stabilisation of the gas. In one form, the compression treatment station and the gas stabilisation station are one and the same treatment station. In one form, there is a preliminary stabilisation step or device located intermediate the source of the exhaust or waste gas stream and the first treatment station.

In some embodiments, at least one or more of the reactors is a wet reactor in which the reactor or reactors contain at least partially, a liquid. Typically, the liquid is contained in a sealed or part sealed compartment or chamber formed or located within the reactor.

In one form, at least one of the reactors is provided with at least one liquid precipitating and/or nucleating agent. In one form, two or more of the treatment stations are each provided with a liquid precipitating and/or nucleating agent. In one form, the same liquid nucleating agent is present in each of the reactors which are in the form of a liquid reactor. In another form, each reactor has a different liquid precipitating and/or nucleating agent. It is to be noted that the nucleating step is a preliminary, or one of the initial steps in precipitation of the solid material.

Typically, the liquid nucleating agent has at least one component, preferably two or more components, more preferably, two or more different types of components.

In one form, the liquid nucleating agent contains at least one or more of a lubricating agent, a bonding agent, a retaining and/or regenerating agent or combinations thereof.

It is to be noted that the composition of the liquid nucleating agent can be a combination of at least one or more than one, or all of the above indicated types of materials in any ration in any combination.

In one form, the apparatus has recycling conduits for returning untreated, partially treated or treated exhaust or waste gas streams to the same of a preceding treatment station. In one form, each reactor has a return conduit for returning initially treated, oxygenated, subsequent treated or cleaned gas streams to an upstream location of the process or apparatus.

DESCRIPTION OF THE DRAWINGS

Aspects and/or embodiments of processes, methods, apparatus and devices in accordance with embodiments of the invention will now be described, by way of examples to illustrate forms of the invention, with particular reference to the accompanying drawings in which.

DESCRIPTION OF SPECIFIC EMBODIMENTS

One embodiment of the method and process using one form of the apparatus or installation of the present invention will now be described with reference to the drawings.

As a preliminary, it is pointed out that SPRS technology generally involves a number of individual steps or processes which are combined together and/or operated in one or more sequences to achieve the cleaning of exhaust gas streams emitted from a variety of sources, so as to remove pollutants or other unwanted materials from the exhaust gas stream to clean the exhaust gas stream using combinations of technology steps involving solidification, separation and accumulation or collection of exhaust gases through constant or variable compression of gases and sequential temperature reduction as well as solidification of materials to remove unwanted pollutants from exhaust gas streams whilst maintaining stabilisation in the form of controlled flow of gasses of the exhaust gas stream during the various treatment steps occurring in the various treatment stations as the gas stream is moved through the apparatus in sequence.

EXAMPLE 1

One application of SPRS technology which will now be described, is the treatment of exhaust gases emitted from the exhaust pipe of a motor vehicle generally denoted as 10 which is a stylised representation of a source of waste or exhaust gas. The exhaust gas of the motor vehicle are produced by combustion processes of the engine of the motor vehicle to clean the exhaust gases sufficiently to allow discharge of the cleaned gases directly to atmosphere.

A connector, typically in the form of a flange, or other similar or suitable connector (not shown), is fitted to the distal end of an exhaust pipe of a motor vehicle extending from the rear of the vehicle. If there is more than a single exhaust pipe, flanges are fitted to the ends of each exhaust pipe. However, this example will be described with reference to a vehicle having a single exhaust pipe only. The flange which is fixedly connected to the end of the exhaust pipe outlet, provides a suitable connector for a correspondingly shaped and sized second flange (not shown), which can be securely connected to the flange of the exhaust pipe by a suitable fastener or by a friction or interference fit. The second flange is located at one end of a suitable conduit 12. In one form, the conduit 12 is an extended conduit, typically in the form of a pipe or hose. Typically, in one form, the conduit is an extended corrugated pipe. The corrugated pipe is either a flexible pipe, concertina pipe, spiral pipe, helical pipe, or similar, which is capable of expansion and contraction lengthwise or the like so as to adjust the length of the pipe. The pipe can be made from any suitable material having the required properties of being resistant to corrosion and able to withstand high temperatures. In one form, the material of the pipe is resistant to corrosive exhaust gases, as well as being able to withstand the temperatures of hot exhaust gases. In one preferred form, the pipe is made from stainless steel, typically 316 stainless steel.

Typically, the diameter of the corrugated pipe matches generally the diameter of the exhaust pipe of the motor vehicle. The other end of the extended corrugated pipe is connected to the inlet 14 of a first treatment station 16, by a suitable connector (not shown) to make a substantially gas tight connection. Typically, the first treatment station is a first reactor in the form of a tank, vessel or other container, particularly a cylindrical container or the like so that the reactor is in fluid communication with the exhaust pipe via the extended conduit.

It is to be noted that the reactor can be of any size, shape, form, or be of any suitable type or arrangement, and be made of any suitable material. In one form, the inlet of the first reactor is located at or towards the top of the reactor. However, in other forms, the inlet can be located in the side of the first reactor or at or towards the base of the reactor.

The conduit 12 can be connected directly to the first reactor 16 or conduit 12 can be provided with optional other components, such as for example, a bypass valve 18, a gas stabiliser 20 (to be described in more detail later in this specification), or other suitable component.

A distributor in the form of a T-pipe (not shown_having a single entry in the stem of the T and two outlets on either side of the cross arm of the T is located at the top of reactor 16 in fluid communication with inlet 14 to introduce the exhaust gas stream into the reactor. In one form, the T-pipe is inverted inside the first reactor. Other forms of the distributor are possible, such as for example, side entry. The distributor can have any suitable or convenient form. Exhaust gases from the motor vehicle are directed through the extended corrugated pipe to the T-piece via inlet 14 of first reactor 16 where the incoming gas stream is split for delivery of the gases to both the left hand side and the right hand side of the distributor and hence to both sides of the first reactor to allow for more even distribution of the exhaust gas within the reactor and hence more uniform reaction within the reactor.

In one form, the extended corrugated pipe is provided optionally with a heat exchanger or other cooling device (not shown) for lowering the temperature of the exhaust gases admitted to the corrugated pipe through the flanged connector in order to reduce the temperature of the exhaust gas stream before entering the first reactor, in order to enhance the efficiency of removal of the unwanted materials from the exhaust gas, as will be described later.

In one form, the pressure of the exhaust gas being admitted to the first reactor is substantially the same as the pressure of the exhaust gas emitted through the exhaust pipe of the motor vehicle. However, in other forms, the exhaust gas pressure may be increased or reduced as required.

In one form, a pump (not shown) is provided for facilitating discharge of solids material to a suitable collector 22, such as for example, to remove excess accumulation of solids in the reactor to a suitable collector in the form of a collection tank, located outside of the reactor, for collection and discharge from the reactor.

In one form, there is a gas stabiliser device 20 located in conduit 12 from the exhaust pipe of the vehicle to the first reactor. In this form of stabiliser, the main exhaust outlet is connected to the stabiliser via a single inlet and then split into two outlets as such as in the form of a T-junction which facilitates a mild drop in temperature which in our experience aids in producing an improved emission reduction rate which could be explained by hot gases vibrating at greater rate than do cool gases. In one form, the gas stabiliser is provided with a hollow chamber or similar into which the exhaust gases are directed, acting as an inlet chamber, and then conveyed to another chamber or similar, acting as an outlet chamber in fluid communication with the inlet chamber. In one form, the gas stabiliser is a gas temperature reducer for gradually reducing the temperature of the gas as the gas travels from the inlet chamber to the outlet chamber as part of the transformational process of transforming gases to solids for removal from the exhaust gas stream.

In one form, there is a bypass valve 18 located in extended conduit 12 from the exhaust pipe to the first reactor for bypassing one or more of the reactors. In one form, the bypass valve is primarily designed to be used as a safety device, in the event that the system needs to be bypassed due to a fault of some kind or due to a maintenance shutdown. In one form, the bypass valve allows exhaust gases to be discharged directly to atmosphere whereas in other forms, the bypass valve allows exhaust gases to be redirected to any one of the reactors, including being recycled to the first reactor.

In one form, inlet 14 to the reactor 16 is located at or towards the top of the reactor for admitting cooled exhaust gas to the top portion of the reactor. In other forms, there are two or more inlets for the cooled exhaust gas stream located at convenient locations of the reactor.

In one form, the distributor in the form of the T-piece has a perforated pipe or similar having a multitude of apertures through which gas can be introduced into the interior of the first reactor, such as for example, for directing gases into and through the reactor in a constant downward direction through the reactor to assist in creating a uniform flow and spread of exhaust gas within the reactor. In one form, the first reactor is a wet reactor, primarily an aqueous based wet reactor. However, wet materials other than water can be used in forms of the reactor. In some forms of the reactor, such as for example, additive materials, absorbing materials or absorbents can be added to the reactor either as incoming streams of materials through dedicated inlets or through common inlets together with other materials. Some forms of the additives can react with one or more of the components of the exhaust gas stream.

The first reactor is at least partially filled with a first nucleating liquid for interacting with the gas being introduced downwardly through the distributor as the gas enters into the first reactor and travels through the nucleating liquid to permit reaction of the gas with the liquid nucleating agent.

In one form, the liquid nucleating agent in the first reactor is located at or towards the top of the reactor, such as for example, immediately below the level of the distributor or more particularly, immediately below the apertures of the distributor through which the gas is discharged. In one form, the nucleating liquid is in a chamber or compartment located within the first reactor, typically, a sealed or part sealed chamber or compartment for constraining the liquid in order to maintain the liquid level in the first reactor.

In one form, the nucleating agent has a first part, referred to as Part A. In one form, Part A is a lubricating agent. The lubricating agent can be a single lubricating agent, compound or composition, or can be a combination of two or more lubricating agents, compounds or compositions. The lubricating agent facilitates discharge from the reactor of the solid material being removed from the exhaust gas stream during treatment with the nucleating/precipitating agent which collects as a solid at or towards the base of the reactor so as to improve the efficiency of the treatment.

In one form, another component of the liquid nucleating agent is a second part, which is referred to as Part B. In one form, Part B is a bonding agent. The bonding agent can be a single bonding agent, compound or composition or can be two or more bonding agents, compounds or compositions.

In one form, the whole system within the reactor acts as one controlled environment under constant controlled flow of gases, so that the bonding agent aids in keeping the molecular structure of the solidified material stable, such as for example, in case of removal of $SO_2$ from the exhaust gas stream being treated, the sulphur which is removed will be in the form of a solid while the $O_2$ is released into the gas stream to form the oxygenated gas stream. It will also do the same for any other gas.

In one form, the nucleating agent has a third part which is referred to as Part C. In one form, Part C is a retaining and/or regenerating agent which can be a single, or two or more retaining and/or regenerating agents.

In one form of component C, once the solid material is removed from the system, the regenerating agent facilitates bonding of similar solid materials together so as to collect the different types of solids in accordance with their respective weights by bonding the same materials together which allows easy separation of different solidified materials. This also allows parts of the removed solid materials to be reused again as a nucleating agent thus creating little or no waste.

It is to be noted that, in some embodiments there is only one compound of one component, whereas in other embodiments, there are combinations of two or more components or combinations of each component so that the liquid nucleating agent can be a simple mixture or composition or a complex mixture or composition having many separate different compounds or parts.

It is to be noted that the relative amounts of each of component A, B and C can be in any proportion depending upon the application of the treatment system. In one form of the nucleating/precipitating agent, the volume of each component will be directly proportional to the type of emission source.

A typical range of component A will be from about 5% to about 95%, preferably from about 5% to about 95%, preferably from about 60% to about 90%, more preferably about 75% to 85% by weight based on the total weight of the liquid.

A typical range of component B will be from about 1% to about 70%, preferably from about 5% to 35%, and more preferably about 10% to 20% by weight.

A typical range of component C will be about 1% to about 50%, preferably about 2% to about 25%, more preferably about 10% to about 20% by weight.

In one form, the amount of each component in the liquid is as follows: A is 80%, B is 15% and C is 5% for treatment of exhaust or waste gases from diesel engine combustion. There will be different percentages of each of the components through different chambers of the reactors if the system design warrants multiple chambers to operate in sequence.

It is to be noted that the selection of a particular type of bonding agent is in accordance with the type of exhaust gases being treated and the nature, type and/or amount of unwanted materials or pollutants contained within the exhaust gas stream which is or are to be removed.

In the first reactor, when the gas being treated passes from the apertures of the distributor into and through the nucleating liquid in the first stage or liquid stage, of the process taking place in the first reactor, the exhaust gas stream is cooled rapidly and absorbed by the liquid. During this process, which is the initial interaction between the gas and liquid, some solid material in the form of solid particles or similar are created from this interaction which being heavier than the liquid, fall under the effect of gravity to accumulate at or towards the base of the reactor as a solid deposit.

Without wishing to be bound by theory, it is thought that all of the mixture makes the reaction possible to remove the unwanted materials. Liquid as such is lacking oxygen rich environment thus does not allow oxidising within the liquid because the controlled flow creates a compression state in the reactor chamber which acts as an aid to molecular weight of already oxidised gases to drop and pass through their oxygen molecule. Thus the oxygen content increases at the outlet.

In one form the solid particles are produced by one or other of the unwanted materials, such as for example, sulphur dioxide contained in the exhaust gas. In this form, the gaseous sulphur dioxide of the exhaust gas stream is converted into solid sulphur compounds by reaction with the liquid nucleating agent, particularly solid elemental sulphur particles which are precipitated out of the liquid and deposited at the base of the reactor where they accumulate and to assist in forming the oxygenate gas stream discharged from the first reactor. This conversion from $SO_2$ to sulphur is accompanied by the release of oxygen molecules into the liquid. In one form, the interaction of the cooled exhaust gas and the liquid of the liquid nucleating agent reduces the amount of $SO_2$ in the exhaust gas to a residual amount only to thus allow the gas to be discharged directly to atmosphere. In one form, substantially all of the sulphur contained in the $SO_2$ is deposited as elemental sulphur at or towards the bottom or base of the reactor for periodic removal as the sulphur particles accumulate.

In other forms, hydrocarbons generally of the formula CxHy are retained in the liquid in the first reactor.

Owing to the release of oxygen molecules into the nucleating liquid, the remaining gases in the gas stream are available to bond with the extra oxygen molecules released into the gas stream and with the assistance of the bonding agent, bond to the oxygen molecules in order to convert the monoxides present in the exhaust gas stream to corresponding dioxides and/or higher oxides, so that the initially treated exhaust gas stream has increased amounts of dioxides of the unwanted materials.

The first reaction vessel 16 is provided with a gaseous outlet 22 for discharging a treated gas stream from the first reactor after treatment with the first nucleating liquid. In one form, the outlet is an exit delivery gate. It is to be noted that the exit delivery gate is arranged so as to allow gas to be discharged, but prevent the first nucleating liquid from being discharged from the first reactor along with the gas, such as for example, being discharged to the second reactor. In one form, the gas outlet is a one-way gas outlet valve or the like, which allows for the discharge of treated gas but retains the liquid within the reactor. In one form, outlet 22 is situated above the liquid level of the reactor chamber. Thus, the gravitational forces keep the liquid contained within. Further, the pipe is fixed to a hollow box which provides pipe separation of the pipe between the entry pipe and the exit pipe.

The solid material precipitated from the first nucleating liquid is deposited at or towards the base of the reactor for periodic removal through a suitable outlet 24 such as for example a drain, dump valve or the like.

In one form, the first reactor is a wet reactor, or wet chamber and it filled with the liquid nucleating agent to about 10-15% of the capacity of the reactor. Preferably, the liquid is retained towards the top of the reactor in a compartment or similar. Because the exit pipe is located at the high end of the chamber and the drain pipe does not allow for total fill of the chamber, the reactive liquid will always stay within the chamber without spilling or passing to the next chamber. A check of the level of the liquid can be done manually or be automated, such as for example, with the addition of level meters and external pumps, the process can be automated to maintain the amount or level of the liquid nucleating agent constant within the reactor.

The remaining body of space in the first reactor is primarily for accumulation and build up of solids. As an example, when the chamber for collecting solids is full of solids to about 90% capacity, the chamber is emptied via a release valve into storage containers for disposal of the solid material or for subsequent treatment of the solid material to convert or transform the solid material into a more useful form for reuse, recycling or for use in another application or for another purpose.

A transfer conduit 26 in the form of a pipe extends from the gas outlet 22 of first reactor 16 to inlet 28 of a second treatment station 28, 30 for transferring treated gas from the first reactor to the second treatment station. The second treatment station is in the form of a second reactor, vessel, tank or other container provided with a gas outlet 32 for discharging treated gas therefrom and a solids outlet 34 for removing accumulated solid material from the base of the reactor to collector 36. A distributor in the form of a T-piece is provided at or towards the top of the second reactor. The entrance to the T-piece being the base of the stem of the T, is in fluid communication with the gas inlet. The second reactor is typically of a smaller capacity than the capacity of the first reactor and is provided with a distributor having a multitude of perforations or apertures along one side for discharging gases admitted to the second reactor into the interior of the second reactor. Gases such as the treated exhaust gases, are distributed to both the left hand side and the right hand side of the second reactor. Again, a pump is optionally provided in transfer conduit 26 between the first reactor and the second reactor in order to increase the pressure of the treated exhaust gas in the conduit for admission to the second reactor. Alternatively, the pressure possessed by the first treated gas stream being discharged from the first reactor can be used to convey the treated exhaust gas to the inlet of the second reactor.

A second liquid nucleating agent is provided within the second reactor. The second nucleating agent can have any suitable or convenient composition. Typically, the second nucleating agent comprises a first part, referred to as Part A, which is a lubricating agent, a second part referred to as Part B, which is typically a bonding agent, and a third part referred to as Part C which is typically a retaining and regenerating agent.

In one form, the second nucleating agent, in the event of having multiple systems operating in sequence will have slightly different compositions depending upon requirements. The type or composition of the nucleating agent will be determined by the type of exhaust gas stream being treated, and the amounts of gases present at the exit of each chamber. As in FIG. 2 each reactor can have a different nucleating agent of variance on proportions of part of A,B,C of the nucleating agent. This could be required if larger volumes of a particular gas need to be removed such as COx or Nox emissions.

It is to be noted that a single lubricating agent, or a combination of two or more lubricating agents can be used as Part A of the liquid nucleating agent. Similarly, a single bonding agent, or a combination of two or more bonding agents can be used as Part B of the liquid. A single retaining and regenerating agent, or a combination of two or more retaining and regenerating agents can be used.

Further, it is to be noted that the second nucleating liquid can have a single component selected from either of Part A, Part B or Part C, or have a mixture of agents selected from any one or more of Parts A, B and C including in any amount, ratio or combination.

The composition of the second nucleating agent can be the same or different to the composition of the first nucleating agent.

Further, it is to be noted that the bonding agent of Part B of the second liquid nucleating agent is used to assist bonding of the unwanted materials in the exhaust gas with excess oxygen molecules released into the second nucleating agent to convert remaining unwanted materials to a next higher oxidation state, or oxidation number, such as for example, transforming monoxides of the unwanted compounds to dioxides of the unwanted material. Typically, the $NO_x$ compounds are converted to $N_2$ and/or to $NO_{x+1}$ or $NO_{n+2}$ compounds depending upon conditions prevailing within the reactor and the nature and type of the nucleating liquid. During passage of the exhaust gas through the nucleating liquid in the liquid stage of the reactor, the exhaust gases are further cooled by passage from the distributor in a downwards direction through the reactor for interaction with the liquid nucleating agent. As a result of the interaction of the gas and the liquid, a substantial amount of particulate matter is precipitated out of the liquid and accumulates for collection at the base of the reactor for subsequent removal through a suitable valve or the like.

It is to be noted that the substantial portion of $NO_x$ compounds, $CO_x$ compounds and $C_xH_y$ compounds in the exhaust gas are converted to corresponding solid materials for accumulation at the base of the reactor.

In one form, the second reactor contains the nucleating liquid agent to an amount which is about 10 to 15% of the internal capacity of the reactor. The remaining capacity in the second reactor is for the accumulation and collection of solid material deposited from the liquid nucleating agent formed by passage of the gas through the liquid. Once the amount of solids collected at the base of the second reactor is an amount corresponding to about 90% of the capacity of this space, the solids are removed such as for example, by operation of a suitable release valve to dump the solids into suitable storage containers for disposal or reuse, such as for example, by being transformed into useful products.

Further, it is to be noted that the remaining volume of the reactor after draining of the unwanted solids material, is maintained at a level corresponding to 10 to 15% of the capacity of the reactor.

The second reactor is provided with gas outlet 32 through which further treated exhaust gas or subsequent or second treated exhaust gas can be discharged from the second reactor into a third treatment station 40.

In one form, the third treatment station is an additional treatment station, which is either similar to the first and second treatment station, optionally being of the same or a smaller capacity than the second treatment station, or being a different type of reactor. There can be any number of separate treatment stations, all similar to the first or second treatment stations. Thus, an installation of multiple treatment stations can have 3, 4, 5 or more separate treatment stations. A fourth treatment station, in the form of a reactor 50 is provided in the form of the system shown in FIG. 1.

In one form, third treatment station 40 is a different station to the first or second treatment stations. In one form, the third treatment station is a filter station such as for example, a filter-like stage (FLS). Although filtration of the introduced gas stream can occur in the filtration stage, the FLS is not designed primarily to act as a filter but rather the predominant function of the FLS is to reduce the gas flow through the filter stage to compress the gas being treated. Accordingly, in one form, the third treatment station is a compressor for compressing the second treated exhaust gas stream between the inlet of the third treatment station and the outlet of the third treatment station.

In one form, the compression is a variable compression in which there is variable internal ambient compression for facilitating increased rates of bonding between the gas molecules such as for example, to increase the rate of molecular bonding of gas molecules with the nucleating liquid from the first and second reactors. In one form, the compression stage increases the amount of bonding of the materials already present in the gas stream.

In one form the compression is a constant compression throughout the third treatment station.

The structure and/or arrangement of the FLS is such so as to substantially prevent contact between atmospheric air and the gas molecules within the FLS, particularly when the gas molecules are in the compressed state. In one form, the FLS is, or is provided with, an air tight chamber whereas in other forms, the FLS is sealed against the ingress of air internally into the interior of the FLS. In one form, the FLS is situated in a dedicated dry chamber within the third reactor in which the dry chamber is provided with a collector for collecting moisture, dew, condensation, liquid drops or the like, or other liquid residue in order to keep the interior of the FLS dry. In one form the compressor created environment within the dry chamber acts as a dehumidifier.

In one form, a gas conditioner 42 is optionally located in control conduit 44 which extends from outlet 32 of second reactor 30 to gas conditioner 42. It is to be noted that one of the functions, typically the main function, of the gas conditioner is to maintain the reduction in temperature of the second treated gas stream and of the gases being treated and also to retain the main liquid in the second reactor to prevent the liquid from being conveyed freely into the FLS. In one form, this is achieved by control conduit 42 having a first pipe 42 which extends from the exit or discharge pipe 32 of second reactor 30 being connected to a suitable plenum chamber or the like, typically a hollow stainless steel box or similar, and having a second pipe 46 extending as the outlet pipe from the plenum chamber being connected to inlet 48 of the FLS. The space between the first and second pipes of the control conduit on either side of the plenum chamber and the plenum chamber itself provides sufficient separation to prevent direct liquid transfer from one chamber to the next.

After passage through the first reactor and the second reactor, and optionally through any other similar reactors, and finally through the FLS stage, the exhaust gas is cleaned to an extent that it is able to be discharged to atmosphere as it is substantially free of unwanted materials or substances, including pollutants, toxic materials, particulate materials or the like, and accordingly, can be discharged directly to atmosphere.

In one form, it is thought that the compression is a result of the final filter like stage. This puts the constant flow of gases under pressure from the main entry or inlet to the exit or final outlet after passing through all of the chambers.

It is to be noted that one aspect of the process as described is a requirement for stabilisation of gases at various stages in the process through reduction in temperature occurring at a variety of locations. Whilst not wishing to be bound by theory, it is thought that the stabilisation of gases through temperature reduction is due to the vibration patterns of the molecules of gas through the process of converting fuel into energy, i.e. through the combustion process or stage. It is believed that when gases move from the combustion chamber of the engine to the exhaust system of the vehicle, the exhaust gases formed in the combustion chamber cool, resulting in reduction of vibration of the molecules forming the gases. The hotter the gases, the greater the vibration within the gases so that as the gases cool, the vibration reduces, thus making the cooled gases easier to be treated to remove unwanted materials, such as for example the gases are easier to reduce/capture/treat or the like so as to clean the gases by removing the unwanted materials.

The apparatus and process of the present invention has general application in a variety of different locations where there is combustion of fossil fuels, such as for example, cleaning waste gases or exhaust gases from industrial plants or installations or the like, such as for example, roasting or smelting processes, power generation processes, manufacturing processes, and similar. The applications include the following:

Coal fired power stations.
Diesel generators.
Diesel public transportation.
Diesel freight trains and shipping.
Incinerators.
Industrial and mining processes.
Urban atmospheric conditioning and air quality control.
Household fire places.
SPRS by-product usability and applications in other industries.
Underground road tunnels.

A number of tests were conducted to evaluate the composition of the exhaust gas stream emitted from the exhaust of a motor vehicle as compared to the composition of the same exhaust gas stream after treatment in accordance with the method and apparatus of the present invention using the SPRS technology as describe in Example 1. A number of different tests were conducted at different times. Details of and the results obtained from the various tests are shown in Tables 1, 2 and 3 respectively. In almost all cases, there was a decrease in the amount of unwanted materials in the exhaust gas composition, typically decreases of about 3% to 80% depending upon the exact pollutant being removed. Typically, the reduction in amounts of the unwanted material is from about 0% up to and including about 60% depending upon the particular unwanted material. In one form, almost all of the $SO_2$ was removed from the treated exhaust gas stream. The results obtained from a first test are shown in Table 1. The results of a second test are shown in Table 2, and the results of a third test are shown in Table 3.

Test one was an official test done at a NATA facility. Prior to this test, qualitative tests only were conducted on the gases, such as for example, the "smell tests" to determine the presence of unwanted materials which could be deleted by smelling because of the type of odour of the unwanted materials. Very good $SO_2$ reduction was observed from the results of the first test. Other gases showed reduction of unwanted materials which in turn indicated that chemical reactions were taking place when using the SPRS technology of the present invention.

A second test was performed within a few weeks of the first being done. The main difference between the first and second tests was the improved sealing of the FLS reactor. The results showed improvement in the reduction of emissions and also indicated improvements and consistency of $SO_2$ reduction.

A third test was conducted with a gas sensor instrument. This test was designed to demonstrate the consistency of $SO_2$ reduction. It was noted that the amount of $SO_2$ present in the cleaned gas stream was reduced by up to 100%.

After conducting all three tests, it was concluded that the system required rebuilding in order to be able to conduct the tests for longer duration of testing. Accordingly, a further test, test number 4 was conducted. The fourth test was a snap shot at the levels of emissions of the various unwanted materials. The results of this fourth test proved to be more reliable and of better performance. Alteration to the filter material in the chamber/reactor proved positive in relation to $NO_x$ reduction. Also the increase in capacity of the reactors by additionally including the introduction of a second chamber/reactor proved very positive in further reducing the amount of unwanted materials removed from the exhaust gases.

At this stage, it has been established and confirmed that the whole emission spectrum can be treated simultaneously using the present invention and more encouraging results obtained along with an improved understanding of the test results. It also confirms that the viability of the invention is very good.

It also confirms that the collection volume of the gases in the collection chamber is directly proportional to the volume of fuel consumed by the engine in litres. This means that if 10 litres of diesel is combusted, 10 litres of material is captured. Furthermore, it is believed that some of this material can be converted back into fuel for re-combustion in the engine, thus improving the efficiency of the engine and producing proportionally less unwanted materials.

From the test results obtained, it can be concluded that significant cleaning of the exhaust gas emitted from the exhaust pipe of the vehicles tested resulted in the following:

Reduction of sulphur dioxide ($SO_2$) by consistent 100%.
Reduction of carbon monoxide (CO) by 34%.
Reduction of hydrocarbons ($C_xH_y$) by 63%.
Calculated reduction of carbon dioxide ($CO_2$) based on $O_2$ level indicated reduction by 24%.
Increase of oxygen from the exhaust by 46%.
Reduction of gas temperature (EGT) by 82%.
Reduction of Particulate Matter PM's (PM10, 5 and 2.5) by 100%.
Reduction of Nox emissions by 80%.

In other applications, the treatment system can be used to treat exhaust or waste gas streams from other sources, such as for example, a coal fired power station, gold roasting processing plant, underground mining operations or the like.

Figure 1:
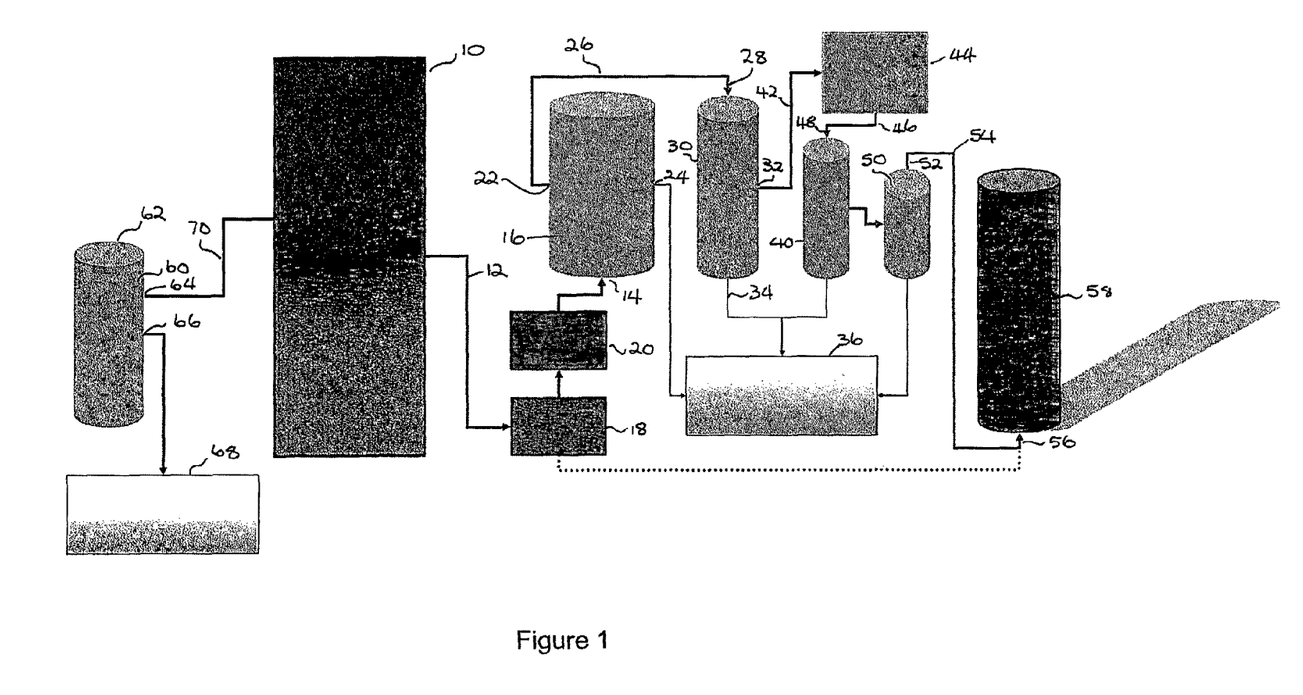
FIG. 1 is a schematic flow chart of one form of the process and apparatus for treating exhaust gas streams using SPRS technology.

In treating the waste or exhaust gases from coal fired power plants an optional pre-treatment stage can be utilised, such as for example, to reduce the nitrogen content of air being introduced into the combustion process as illustrated in FIG. 1. An optional reactor 60 is provided with an air inlet 62, an air outlet 64 for discharging air depleted of nitrogen from reactor 60 after treatment and nitrogen outlet 66 connected to nitrogen collection tank 68 for storing nitrogen. Conduit 70 extends from air outlet 64 to the input of the source of waste or exhaust gas, in this case, the air inlet of the coal fired power plant represented as 10 in a stylised manner. This pre-treatment reduces the amount of nitrogen being introduced with the air for combustion in the coal fired power plant so that less nitrogen oxides (NOx) are present in the exhaust or waste gases so that less NOx has to be removed by the treatment system involving the reactors.

Additionally, forms of the treatment system of the invention include an optional post treatment stage, particularly when the treatment system is used on an industrial scale, such as for example, to clean the waste gas streams from coal fired power plants. In one form, a conduit 54 extends from outlet 52 from the last reactor 50 to inlet 56 of a flue gas stack 58 in which further treatment of the cleaned gas stream can take place to reduce further any unwanted contaminants from the cleaned gas stream discharged from reactor 80.

Figure 2:
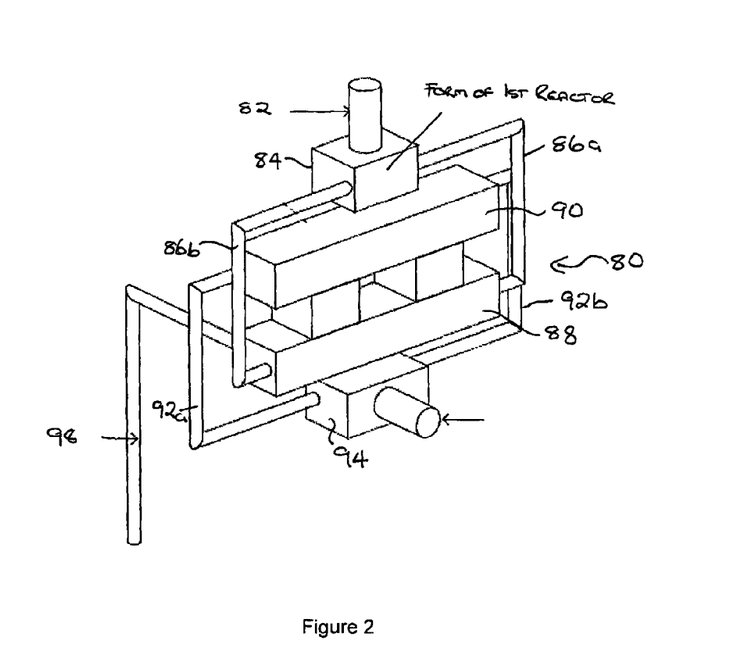
FIG. 2 is a schematic perspective view of one form of one reactor of the apparatus for using SPRS technology to clean waste gases from an industrial plant.

In FIG. 2 is shown a more detailed view of one form of an individual reactor which can be utilised in the treatment system.

The form of the reactor, represented schematically or in a stylised manner, generally denoted as 80, is provided with an exhaust gas inlet 82, a first inlet chamber 84, a pair of upper conduits 86a, 86b extending from first chamber 84 on either side thereof to second reactor chamber 88 which is in fluid communication with a third reactor chamber 90 located at a level above second reactor chamber 88. Second and third chambers 88, 90 are in fluid communication through transfer passages 92a, 92b extending between the two chambers. The nucleating agent/precipitating agent is located within second reactor chamber 88. A pair of lower conduits 92a, 92b extend from either side of third reactor chamber 90 to a fourth outlet chamber 94 having outlet 96 for discharging the treated gas stream to a subsequent reactor. Fourth outlet chamber 94 is provided with a second outlet 98 for discharging excess gas to a subsequent reactor for further treatment. Operation of reactor 80 is the same or similar to the previously described reactors.

Figure 3:
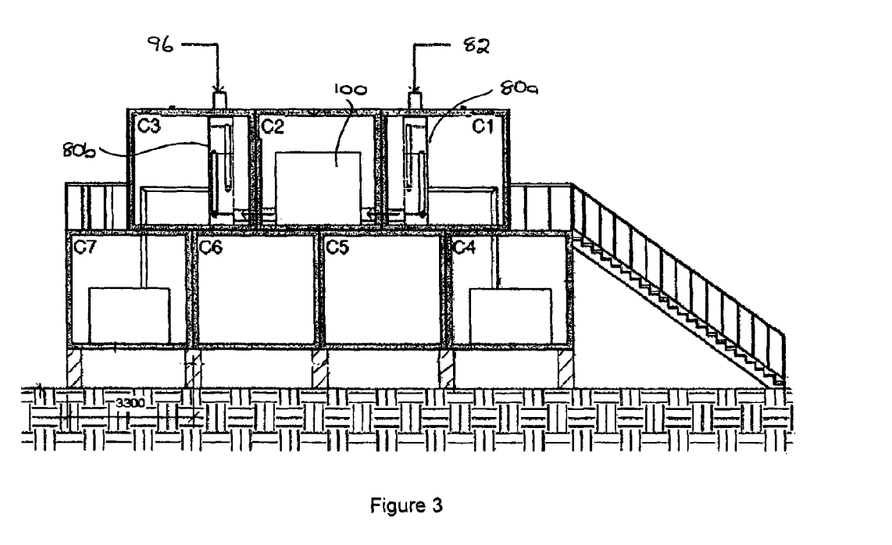
FIG. 3 is a schematic view of one form of an installation having multiple reactors using SPRS technology to clean waste or exhaust gas streams.

In FIG. 3 is shown schematically one form of an installation generally denoted as 110, having multiple reactors housed in shipping containers for easy transportation and assembly. Each container has a dedicated purpose, such as, container C1 houses a first reactor 80a, container C3 houses a second reactor 80b and container C2 houses an air cyclone pump which is in fluid communication with both of reactors 80a, 80b. Other containers, such as containers C4, C5, C6, C7 contain other equipment for use with the installation such as raw materials, supplies, tools, or the like. The waste or exhaust gas stream is introduced through inlet 82, treated initially in reactor 80a, transferred to reactor 80b by pump 100 so that further treatment to clean the gas stream takes place in reactor 80b for discharge through outlet 96. It is to be noted that there can be any number of reactors 80 arranged to operate in sequence and that the installation containing the multiple reactors may be in any suitable of convenient form.

Advantages of the Invention

Advantages of the present invention include that the use of the method and apparatus employing SPRS technology does not require modification to the engine of a vehicle or to the fuel system of the vehicle. All that is required is that the exhaust pipe be in fluid communication with the SPRS apparatus.

Other benefits of using the present invention include the following:
  SPRS offers substantial reduction of pollution such as $SO_x$, $NO_x$, COx and PM's.
  Reducing pollution odour.
  SPRS releases reduced volumes of clean $CO_2$.
  There is no need for tall stacks as emissions can be treated and let into the atmosphere at ground level.
  Substantial reduction of exhaust heat.
  Substantial increase of oxygen O2 which can be directed to the burning chamber to enhance combustion process.
  Increased productivity through optimisation and value for investment.
  If fitted to a vehicle, the engine performance is unaffected.
  The chemical conversions taking place within SPRS technology accumulates a solid and safe to handle material.
  The by-product as such is a pliable compound and early indications are that it can have industrial applications through recycling.
  Some parts of the by-product will be put back into the pollution reduction compounds as recycled material with the same properties as parts of the original formula.
  The by-product in its capacity is an excellent insulator against heat with a multitude of applications. It can be converted to various forms. Further development work is required.
  It can be made as an additive in total reduction of odour deriving from dithiophosphate and dibenzyldiocarbamate material which are used in adhesive applications in the automotive industry.
  The very low cost per tonne of $CO_2$ reduction makes the use of SPRS technology very affordable, thus long term use of systems incorporating the SPRS technology is economically sustainable.

Or the described arrangement has been advanced by explanation and many modifications may be made without departing from the spirit and scope of the invention which includes every novel feature and novel combination of features herein disclosed.

Those skilled in the art will appreciate that the invention described herein is susceptible to variations and modifications other than those specifically described. It is understood that the invention includes all such variations and modifications which fall within the spirit and scope.

The invention claimed is:

1. An apparatus for carrying out a method of treating an exhaust gas stream to remove unwanted materials in order to clean the exhaust gas to be less polluting for discharge to atmosphere, using stabilization of the exhaust gas stream when in the apparatus, the apparatus comprising a first treatment station having an inlet through which the exhaust gas stream is introduced into the first treatment station for treatment therein, in which at least a first unwanted material is substantially removed from the exhaust gas stream substantially in the form of a solid to form an oxygenated gas stream, the first treatment station having an outlet for discharging the oxygenated gas stream to a second treatment station in which at least a second unwanted material is substantially removed from the oxygenated gas stream substantially in the form of a solid, to form a second treated gas stream, and a third treatment station for substantially compressing the second treated gas stream in the absence of atmospheric air to form a cleaned gas stream wherein the gas stream is passed sequentially through the first, second and third treatment stations in sequence to remove substantially the first and the second unwanted materials from the exhaust gas stream.

2. An apparatus according to claim 1, in which the unwanted materials include compositions or compounds containing carbon, nitrogen, sulphur, and include oxides of carbon ($CO_x$), oxides of nitrogen ($NO_x$), oxides of sulphur ($SO_x$) and hydrocarbons ($C_xH_y$).

3. An apparatus according to claim 1, in which the first treatment station is a reactor in the form of a tank, vessel or other container in which the reactor is provided with an inlet for receiving untreated exhaust gas.

4. An apparatus according to claim 1, in which the first reactor has two or more outlets in which one outlet is for discharging initially treated gases and the other outlet is for discharging solids removed from the exhaust gas stream during treatment within the first reactor.

5. An apparatus according to claim 1, in which the reactor is provided with a one-way valve for allowing gas to be discharged from the first reactor but which allows liquid to be retained within the reactor.

6. An apparatus according to claim 1, in which the apparatus comprises at least two treatment stations.

7. An apparatus according to claim 1, in which there are three or more separate treatment stations arranged in sequence so that the gas stream exiting from the immediately preceding reactor is conveyed to the next reactor in the sequence for further treatment.

8. An apparatus according to claim 1, in which at least one of the treatment stations is a gas compressor.

9. An apparatus according to claim 1, in which a gas stabilizer is provided in one of the reactor stations or in the conduit extending between the individual reactor stations.

10. An apparatus according to claim 1, in which stabilization of the gas includes compression of the gas in either or both one of the treatment stations or in the conduits extending between the treatment stations.

11. An apparatus according to claim 1, in which one of the treatment stations is a compressor for compressing the treated gases.

12. An apparatus according to claim 1, in which at least one or more of the separate treatment stations is a wet reactor containing a liquid.

13. An apparatus according to claim 1, in which the liquid is a precipitating and/or nucleating agent for initiating at least separation of solid material from the gas when the gas is in contact with the liquid.

14. An apparatus according to claim 1, in which the nucleating or precipitating liquid is located in a sealed or partially sealed compartment or chamber formed within the wet reactor.

15. An apparatus according to claim 1, in which at least two of the treatment stations are wet reactors containing precipitating and/or nucleating agents.

16. An apparatus according to claim 1, in which the liquid precipitating and/or nucleating agent contains at least one component.

17. An apparatus according to claim 1, in which the liquid precipitating or nucleating agent contains at least one or more of a lubricating agent, a bonding agent, or a retaining and/or regenerating agent or combinations thereof.

18. An apparatus according o claim 1, in which at least one of the treatment stations has a recycling conduit for returning untreated, partially treated, or treated exhaust gas streams to the same treatment station or to a preceding treatment station in the sequence of treatment stations.

19. An apparatus according to claim 1, in which the compression of the gas is a constant compression or is a variable compression.

20. A method of treating an exhaust gas stream to remove unwanted material from the exhaust gas stream in order to clean the exhaust gas so that the cleaned exhaust gas is less polluting than prior to treatment by stabilizing the exhaust gas stream during the treatment, the treatment comprising the steps of directing the exhaust gas stream having at least a first unwanted material and a second unwanted material from a source of the exhaust gas stream to a first treatment station for initially treating the exhaust gas stream to form a first treated stream, said first treatment station being of a first capacity and containing at least a first liquid precipitating or nucleating agent for interaction with at least the first unwanted material of the exhaust gas stream to remove at least some of the at least first unwanted material from the exhaust gas stream to form the first initial treated stream, said first unwanted material being removed from the exhaust gas stream substantially in the form of a solid material, wherein oxygen removed from the first treated stream due to interaction with the first liquid precipitating or nucleating agent to form the substantially solid material is released into the first treated exhaust gas stream to form an oxygenated exhaust gas stream, discharging the oxygenated exhaust gas stream containing the oxygenated material from the first treatment station and introducing the discharged oxygenating exhaust gas stream into a second treatment station of a second capacity, said second capacity being less than the first capacity, said second treatment station containing at least a second liquid precipitating or nucleating agent for interaction with the oxygenated exhaust gas stream to remove at least some of the second unwanted material from the oxygenated exhaust gas stream substantially in the form of solid material so as to form a second treated gas stream, discharging the second treated gas stream from the second treatment station to a third treatment station for compressing the second treated gas stream to form a substantially cleaned gas stream, wherein the third treatment station is substantially isolated from atmosphere so as to substantially prevent atmospheric air from contacting the second treated exhaust gas stream in the third treatment station to interact with the treated gas stream, wherein the clean gas stream discharged from the third treatment station is substantially free of the first and of the second unwanted materials, and discharging the cleaned gas stream to atmosphere so that the cleaned gas stream is less polluting than the untreated exhaust gas stream.

* * * * *